W. KEENAN.
Hat-Pouncing Machine.
No. 226,323.    Patented April 6, 1880.
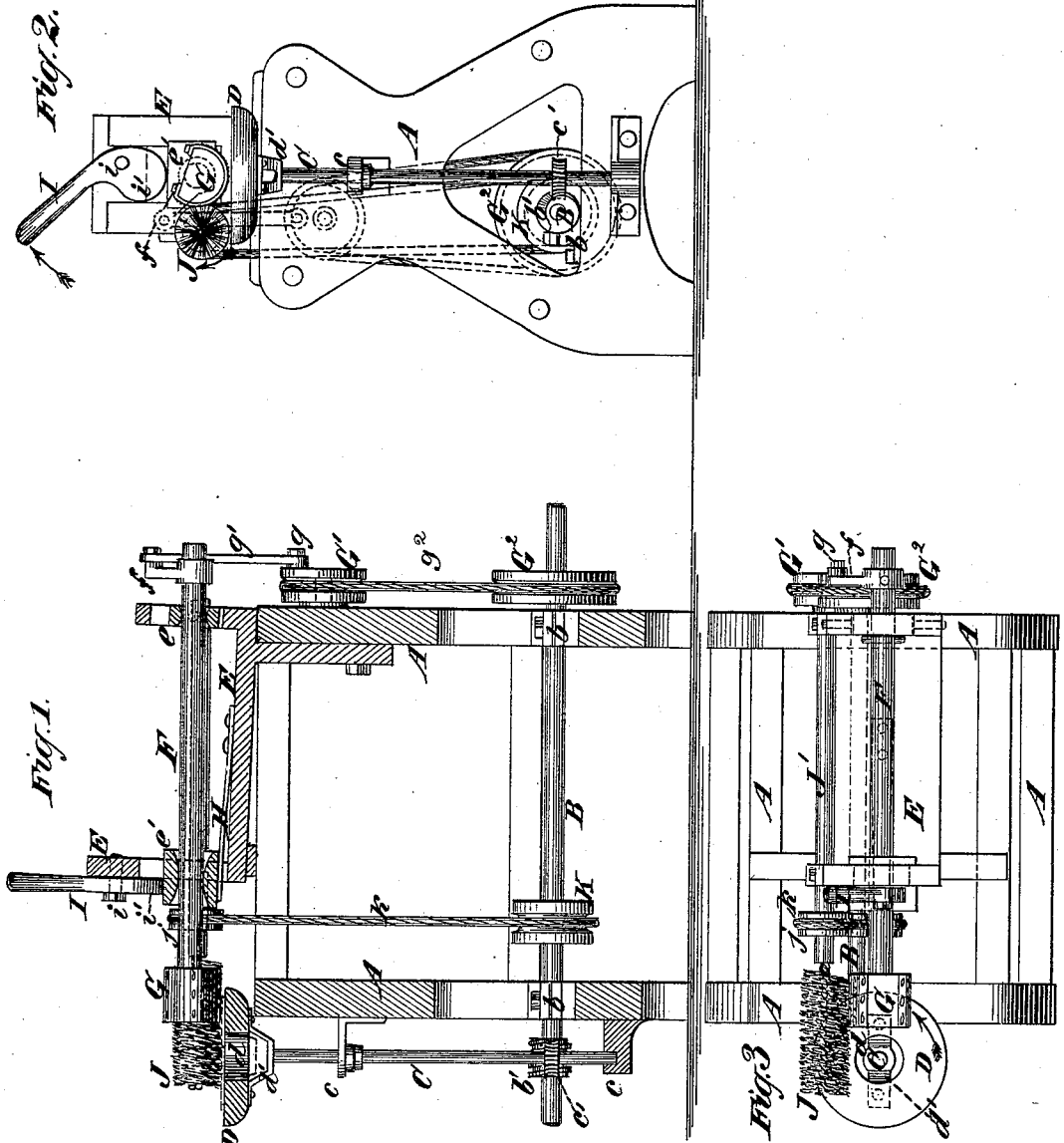

UNITED STATES PATENT OFFICE.

WILLIAM KEENAN, OF BROOKLYN, NEW YORK, ASSIGNOR OF ONE-HALF OF HIS RIGHT TO NICHOLAS B. HOOPER, OF SAME PLACE.

HAT-POUNCING MACHINE.

SPECIFICATION forming part of Letters Patent No. 226,323, dated April 6, 1880.

Application filed December 26, 1879.

*To all whom it may concern:*

Be it known that I, WILLIAM KEENAN, of the city of Brooklyn, in the county of Kings and State of New York, have invented certain new and useful Improvements in Hat-Pouncing Machines, of which the following is a description, reference being had to the accompanying drawings.

This invention is more especially designed for the pouncing of the brims of hats; and its object is to imitate more nearly than has heretofore been accomplished, and by very simple machinery, the operation of hand-pouncing, and yet to accomplish that uniformity of pouncing which can only be effected by machinery.

The said invention consists in the combination of an oscillating or rotary reciprocating lure or pouncing-block with a rotating table, which supports the hat during the pouncing operation and gives it the necessary feed-motion to present all parts of the brim to the action of the said lure or pouncing-block.

It also consists in the combination, with the oscillating or rotary reciprocating lure or pouncing-block, of a rotating table of novel construction.

It also consists in the combination, with the oscillating lure and oscillating or rotary reciprocating pouncing-block, of a rotary brush for brushing away the dust produced in pouncing; and it further consists in certain means whereby provision is afforded for the insertion and removal of the hat from between the oscillating lure or pouncing-block and the rotary table, and for graduating or adjusting the pressure of the said lure or pouncing-block on the hat.

Figure 1 is a vertical section of a machine constructed according to my invention. Fig. 2 is an elevation of the same at right angles to Fig. 1. Fig. 3 is a plan of the same.

A is the main framing of the machine, having bearings $b$ $b$ in its lower part for the horizontal main shaft B of the machine, and bearings $c$ $c$ secured to one end of the shaft C of the rotating table D, and having secured to its upper part a secondary frame, E, which contains the bearings $e$ $e'$ for the nearly horizontal shaft F of the oscillating or rotary reciprocating lure or pouncing-block G, the said shaft being so arranged that its axis is in, or nearly in, the same plane with that of the shaft D.

The rear bearing, $e$, of the lure-shaft F is fitted with transverse trunnions, or otherwise so supported as to permit of the raising and lowering of the front end of the said shaft, to which the lure G is secured; and the front bearing, $e'$, of the said shaft is so fitted to the frame E as to be capable of an upward and downward sliding movement for the same purpose. A spring, H, is secured to the frame E and arranged to press upward against the said bearing $e'$, and a cam-lever, I, is secured to the said frame by a fulcrum-pin, $i$, above the said bearing $e'$, and so arranged that its cam $i'$ may be made to press downward on the said bearing.

The lure or pouncing-block G has a face of curved form concentric with the shaft F, and is represented as of the form of a segment of a cylinder. It is faced with sand-paper or other suitable pouncing material, which is secured or applied to it in the usual or any well-known manner, so as to be capable of easy renewal. On the rear end of the said shaft F there is secured a crank-arm, $f$, which is connected by a rod, $g'$, with a crank-wrist, $g$, carried by a pulley, G', which is arranged on a fixed stud secured in the framing A, and which receives rotary motion through a band, $g^2$, from a pulley, G², on the main shaft B, the said rod $g'$ and arm $f$ giving an oscillating rotary reciprocating motion to the shaft F and lure G.

The rotating supporting-table D is of a circular form, and of an external diameter sufficient for the entire brim of a hat to rest upon it; and in order to provide for the pouncing of the under side of the hat-brim it is shown as having a central circular opening, $d$, large enough to admit the crown of a hat. It is secured to the upper end of the shaft C by a yoke, $d'$. The shaft C is furnished with a worm-gear, $c'$, which gears with an endless screw, $b'$, on the main shaft B, for the purpose of imparting to the said shaft C and the table D a slow rotary motion in the direction of the arrow shown upon it in Fig. 3.

J is the rotary brush, arranged close above the table D, behind the lure, with its axis tangential to the rotating table, as shown in Fig. 1. This brush is secured to a horizontal rotary shaft, J', which works in bearings on the frame E, and which is furnished with a pulley, j, for the reception of a belt, k, through which the said pulley, shaft, and brush receive rotary motion from a pulley, K, on the main shaft.

The operation of the machine is as follows: To permit the introduction of the hat, the cam-lever is turned by the hand of the operator in the direction of the arrow shown near it in Fig. 2, and the lure G is thrown up by the pressure of the spring H on the bearing $e'$ of the shaft F. The hat is then placed concentrically on the table, the lure is depressed by turning the cam-lever in the opposite direction, and on motion being given to the main shaft B several parts of the machine receive the motions hereinbefore described. The oscillating motion of the lure, while the table with the hat upon it rotates, slowly pounces the brim of the hat all round with an action closely resembling the ordinary hand-pouncing operation, while the rotary brush brushes away the dust from the part of the brim which is moving away from the lure. The pressure of the lure and the intensity of its pouncing action are regulated by the attendant, who applies his hand to the lever I. When the pouncing of one surface of the brim is finished the lever is thrown back to allow the lure to rise, and the hat is then removed and turned over, and the operation is repeated on the other surface.

While pouncing the under surface of the brim the crown of the hat, which is then inverted, is received in the opening $d$ of the table.

Instead of the lure-shaft being movable vertically to provide for the insertion and removal of the hat and the graduation of the pressure, the rotating table may be capable of being raised and lowered by a treadle applied to the lower end of its shaft.

I claim—

1. The combination, in a hat-pouncing machine, of an oscillating or rotary reciprocating lure or pouncing-block and a rotating supporting-table, substantially as herein described.

2. The combination, in a hat-pouncing machine, of an oscillating or rotary reciprocating lure or pouncing-block and a rotating supporting-table having an opening for the reception of the crown of the hat, substantially as herein described.

3. The combination, in a hat-pouncing machine, of an oscillating or reciprocating lure or pouncing-block, a rotary supporting-table, and a rotary brush, substantially as herein described.

4. The combination, with the rotary supporting-table and the oscillating or rotary reciprocating lure or pouncing-block and its shaft, of the rising-and-falling bearing $e'$ for the said shaft, the spring H, and the cam-lever I, substantially as herein described.

WILLIAM KEENAN.

Witnesses:
E. P. JESSUP,
FREDK. HAYNES.